No. 836,694. PATENTED NOV. 27, 1906.
L. G. MEYER & E. P. DEHULLU.
BREAD CUTTER.
APPLICATION FILED MAR. 29, 1906.
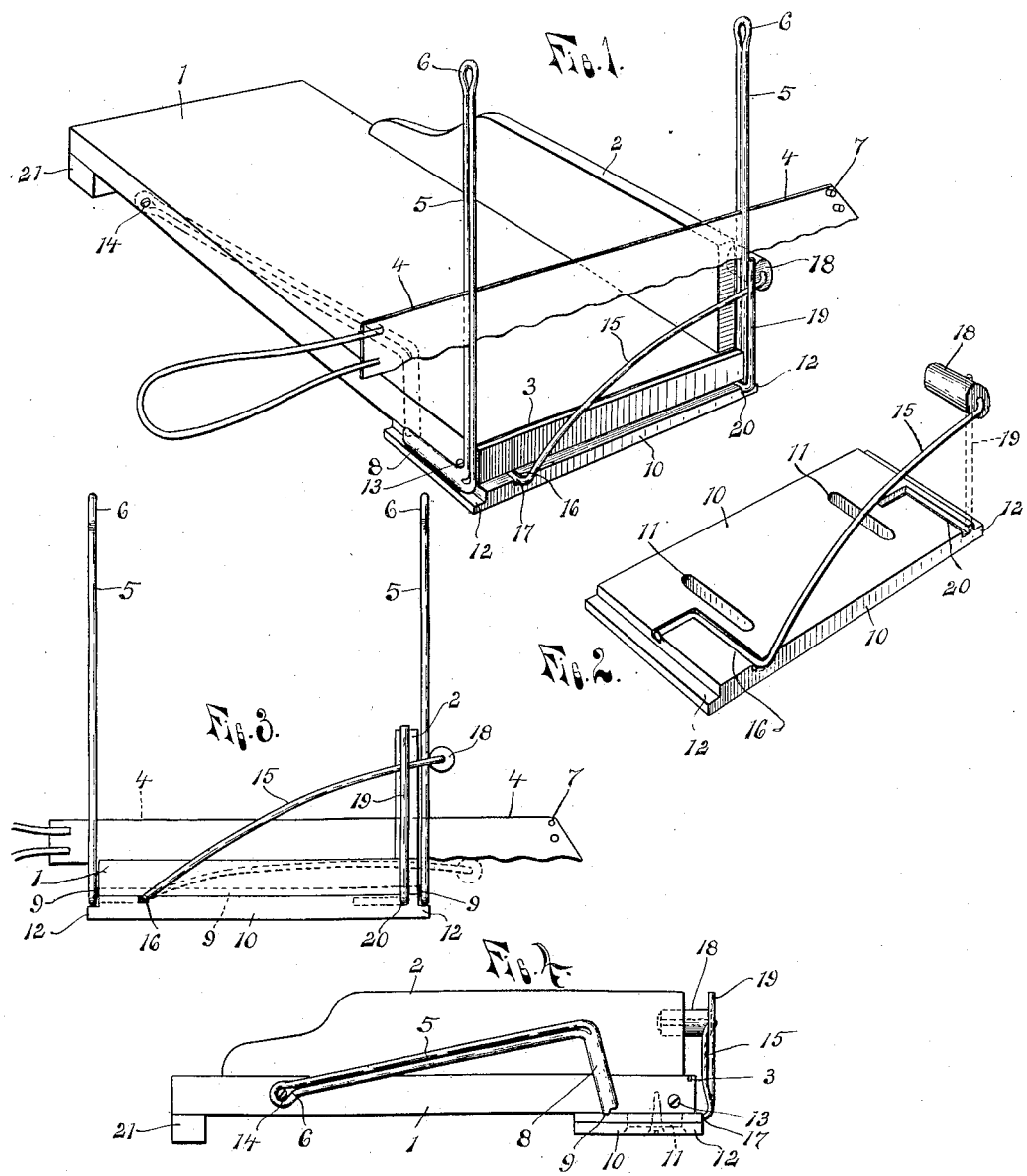
Lambert G. Meyer
Emil P. Dehullu
INVENTORS
WITNESSES:
BY
ATTORNEYS.

UNITED STATES PATENT OFFICE.

LAMBERT G. MEYER AND EMIL P. DEHULLU, OF DETROIT, MICHIGAN.

BREAD-CUTTER.

No. 836,694.   Specification of Letters Patent.   Patented Nov. 27, 1906.

Application filed March 29, 1906. Serial No. 308,647.

*To all whom it may concern:*

Be it known that we, LAMBERT G. MEYER and EMIL P. DEHULLU, citizens of the United States of America, residing at Detroit, in the county of Wayne and State of Michigan, have invented certain new and useful Improvements in Bread-Cutters, of which the following is a specification, reference being had therein to the accompanying drawings.

This invention relates to improvements in bread-cutters; and its object is to provide a cheap and efficient device having vertical guides for the knife, which are so constructed that they may be folded when the device is not in use to take up less room; and a further object is to provide an adjustable gage or stop into contact with which the loaf is moved to gage the thickness of the slice, which stop is arranged to be moved out of contact with the bread by the knife as it descends to permit the slice to fall away from the loaf when severed therefrom.

It is also an object of the invention to provide means for quickly and easily adjusting the parts to regulate the thickness of the slices to be cut and to provide certain other new and useful features, all as hereinafter more fully described, reference being had to the accompanying drawings, in which—

Figure 1 is a perspective view of a device embodying the invention; Fig. 2, a perspective view of the adjusting-board detached; Fig. 3, a front end elevation of the device; and Fig. 4, a side elevation of the same, showing the knife-guides in their folded position.

As shown in the drawings, 1 is a board of suitable width and length upon which the loaf of bread is placed in contact with the vertical guide or side board 2, extending vertically along the rear edge of the bread-board. The side board does not extend quite to the forward end of the bread-board, and the latter is provided with a transverse groove 3 in its upper surface to receive the cutting edge of the bread-knife 4, said knife being guided to descend vertically into said groove by guides 5. These guides are formed of a single piece of rod or heavy wire bent or folded upon itself at each end to form the parallel portions between which the knife is adapted to move freely and to form the loops 6 at the upper ends of said parallel portions, through which loops a pin 7 on the end of the knife-blade may pass, said pin preventing the removal of said knife from the guides except when at their upper ends.

The wire is bent at right angles and brazed or otherwise secured together at the inner ends of said guide portions to form arms 8 and are connected by the middle portion 9 of the wire, which extends across beneath the board 1 within a groove provided therefor and forms the pivot member of said guides. An adjustable board 10 is secured to the bottom of the bread-board 1 over the wire 9 by screws passing through slots 11 in said board 10, thus holding the wire 9 within its groove, and the ends of said adjustable board are each provided with a projecting portion or ledge 12, upon which the arms 8 rest when the guides are in their vertical position. To detachably hold the guides in their vertical position, suitable projections, such as round-headed screws 13, are provided on the edges of the bread-board in a position to engage the upper edges of the arms 8, the wire being adapted to yield sufficiently to permit said arms to slip past the screw-heads when the guides are turned to their vertical position, and said guides are detachably held in their folded position by similar screw heads or projections 14 on the edges of said board near the rear end thereof to engage the loops 6 in the ends of said guides.

A gage to determine the thickness of the slices to be severed is provided consisting of a spring-arm 15, formed of wire firmly and rigidly held at one end by the adjustable board 10 by forming a groove 16 in the upper surface of said board to receive the laterally-bent end 17 of said wire, said end being again bent at right angles in a direction opposite to that in which the arm 15 extends to hold said arm in an upwardly-extending direction in a position to be engaged by the loaf on the bread-board. The free end of said spring-arm is bent at right angles across the path of the knife, and on said end is journaled a wooden roll 18, adapted to be engaged by the knife as it descends in cutting, and thus said gage is depressed by the descending knife out of contact with the slice of bread to permit the same to fall away from the loaf when severed therefrom.

A vertical guide-rod 19 engages the outer side of the spring-gage arm near its free end to prevent said arm from springing laterally when the loaf is moved into engagement therewith, said rod being rigidly held in position by providing a groove 20 in the upper surface of the adjustable board to receive the laterally-bent end of said rod, which end is again bent at right angles to hold the guide portion in a vertical position.

The adjustable board 10 thus carries the gage, and by slackening the screws which hold it to the bread-board it may be quickly moved to adjust said gage toward or from the path of the knife to determine the thickness of the slice. Said adjustable board also forms means for detachably securing the guides, gage, and guide-rod in place, so that the device may be quickly and easily assembled or these parts detached.

A block 21, which is of greater thickness than the adjustable board, is secured to the lower side of the bread-board at its rear end, so that said board will be given a slight inclination, which will cause the slice of bread to more readily fall away from the loaf.

Having thus fully described the invention, what we claim is—

1. In a bread-cutter, the combination with a bread-board, of knife-guides, a laterally-extending arm on one end of each guide pivotally attached to the board, ledges on the board to engage the lower sides of the arms and support the guides in a plane at right angles to the surface of the board, and means for detachably holding said arm in contact with the ledge.

2. In a bread-cutter, the combination of a bread-board having a transverse groove in its lower surface, knife-guides, a laterally-extending arm on one end of each of said guides, a connecting portion connecting the ends of said arms and extending across the board in said groove to form a pivot for the guides, and a board secured to the lower side of the bread-board to hold the connecting portion in its groove and having its ends extended to form a ledge to support the arms.

3. In a bread-cutter, the combination with a bread-board and knife-guides, of a gage consisting of a spring-arm secured at one end to normally project into the path of a loaf moved along the board, a laterally-extending end on the free end of said arm projecting across the path of the knife, and a wooden roll carried by said end adapted to be engaged by the sharp edge of the knife.

4. In a bread-cutter, the combination with a bread-board and knife-guides, of a gage consisting of a spring-arm having laterally-bent ends, a roll adapted to be engaged by the knife to move the gage out of the path of the loaf on one of said ends, a vertical guide-rod engaging the side of said spring-arm near its free end and provided with a laterally-bent lower end, and a board adjustably secured to the lower side of the bread-board and formed with grooves in its upper surface to receive the laterally-bent ends of the spring-arm and guide-rod to secure the same to the board.

5. In a bread-cutter, the combination of a bread-board having a transverse groove in its lower surface, knife-guides, laterally-extending arms on one end of said guides, a connecting portion connecting the ends of said arms and extending across the board in said groove, a gage consisting of a spring-arm having laterally-bent ends one of which is again bent at right angles, a roll adapted to be engaged by the knife to move the gage out of the path of the loaf on one of the said ends, a vertical guide-rod having a laterally-bent lower end, a board formed with slots and with grooves in its upper surface to receive the laterally-bent ends of the spring-arm and guide-rod, screws extending through said slots to adjustably secure the said board to the bread-board and detachably hold the guides, gage and guide-rod in place, and laterally-extending ledges on the ends of the adjustable board to support the arms of the guides when said guides are in their operative position.

6. In a bread-cutter, the combination of a bread-board having a transverse groove in its lower surface near one end, a guide-board secured along one edge of the bread-board, guides formed of a single wire and consisting of parallel guided portions formed with loops at one end and with laterally-bent arms at the opposite end which arms are connected by a connecting portion extending across the bread-board within the groove therein to pivotally attach the guides to the board, a gage consisting of a spring-arm formed with laterally-bent ends, a roll on one of said ends adapted to be engaged by the knife to move the gage out of the path of the loaf, a guide-rod having a laterally-bent lower end and engaging the outer side of the spring-arm near its free end, a board having slots and formed with grooves in its upper surface to receive the laterally-bent ends of the spring-arm and guide-rod, screws extending through said slots to adjustably secure the board to the bread-board over the connecting portion of the guides, laterally-extending ledges on the ends of said adjustable board, and means for engaging the upper sides of the arms of the guides to hold said arms in contact with said ledges.

In testimony whereof we affix our signatures in presence of two witnesses.

LAMBERT G. MEYER.
EMIL P. DEHULLU.

Witnesses:
OTTO F. BARTHEL,
OLIVER E. BARTHEL.